United States Patent [19]
Schroader et al.

[11] 3,741,502
[45] June 26, 1973

[54] LONG RANGE MISSILE PROGRAMMER

[75] Inventors: Irvin H. Schroader, Simpsonville; Melvin E. Hosea, Silver Spring; Vincent J. Caggiano, Rockville; Leo C. Miller, Silver Spring, all of Md.

[73] Assignee: The United States of America as represented by the Secretary of the Navy, Washington, D.C.

[22] Filed: May 15, 1961

[21] Appl. No.: 110,615

[52] U.S. Cl. .............................. 244/3.13, 244/3.14
[51] Int. Cl. .................................................. F41g 7/00
[58] Field of Search ........................ 244/3.13, 83.14, 244/14

[56] References Cited
UNITED STATES PATENTS

| | | | |
|---|---|---|---|
| 2,801,815 | 8/1957 | Williams et al. | 244/3.13 |
| 3,168,264 | 2/1965 | Sendles | 244/3.14 |
| 3,363,858 | 1/1968 | Dobbins et al. | 244/3.14 |

*Primary Examiner*—Samuel Feinberg
*Attorney*—W. O. Quesenberry, Claude Funkhouser and Gilber G. Kovelman

EXEMPLARY CLAIM

In an apparatus for controlling the flight trajectory of a guided missile, second order programming computer and smoother means for manipulating input perameters in accordance with the relations $$e_o = \int_{t=G}^{t=P} \dot{e}_o dt,$$

$$\dot{e}_o = -2\omega_n(e_o - e_i) - \sigma \int_{t=G}^{t=P} \omega_n^2(e_o - e_i)dt$$

$$+ \text{constant}$$

and $e_i = E_T + k(t)[D_r - D_m] = E_T + F(d)$ where $e_o$ is the output data from said computer,
$e_i$ is the input data to said computer,
$\dot{e}_o$ is the first derivative of $e_o$,
$\omega n$ is the gain sensitivity factor of the computer,
$E_T$ is the elevation of the target,
$\sigma$ is a constant,
$P$ is the present time,
$G$ is the time of guidance initiation,
$k(t)$ is a time varying programming factor and $F(d)$ is the output of an input driving function generator, a first input source of voltage for said second order programming computer means relating to $E_T$, driving function generator means $F(d)$ electrically coupled to and directed as a second input to said second order programming computer means, said driving function generator means comprising a climb-cruise phase generator in series with a terminal phase generator, means within said climb-cruise phase generator to produce an output function $F(t) = (bE_{GG} - aD_m)/b + D_m)$ where $F(t)$ is the program variable defining the climb and cruise phases,
$D_M$ is the slant range to the missile,
$E_{GG}$ is the initial condition elevation angle of the guidance transmitter, and
$a$ and $b$ are constants, the output of said climb-cruise phase generator being directed as a first input to said terminal phase generator, means electrically connected to the input of said terminal phase generator providing a second input to said terminal phase generator relating to $E_T$, feedback means electrically connected to the output of said terminal phase generator to feed back the output $F(d)$ of said driving function generator as a third input to said terminal phase generator, means within said terminal phase generator for acting upon said first, second and third inputs prior to terminal phase initiation to produce an output function $$k(t) = \int_G^P [F(d) + E_T - F(t)]dt,$$

means within said terminal phase generator to render ineffective said first, second and third inputs upon terminal phase initiation, means within said terminal phase generator to produce after terminal phase initiation a function $k(t) = k_T + 30\dot{k}_T(1 - l^{-T_{TP}/30})$ where
$k_T$ is the value of $k(t)$ at terminal phase initiation,
$\dot{k}_T$ is the first derivative of $k_T$, and
$T_{TP}$ is the time from terminal phase initiation to the present, means to feed back the output voltage $e_o$ of said second order programming computer means to its input, and means delaying maximum gain sensitivity of said computer means until the missile is within a predetermined range of the target, whereby noisy input radar data is smoothed until maximum maneuverability of the missile is required.

10 Claims, 7 Drawing Figures

United States Patent [19]
Schroader et al.
[11] 3,741,502
[45] June 26, 1973
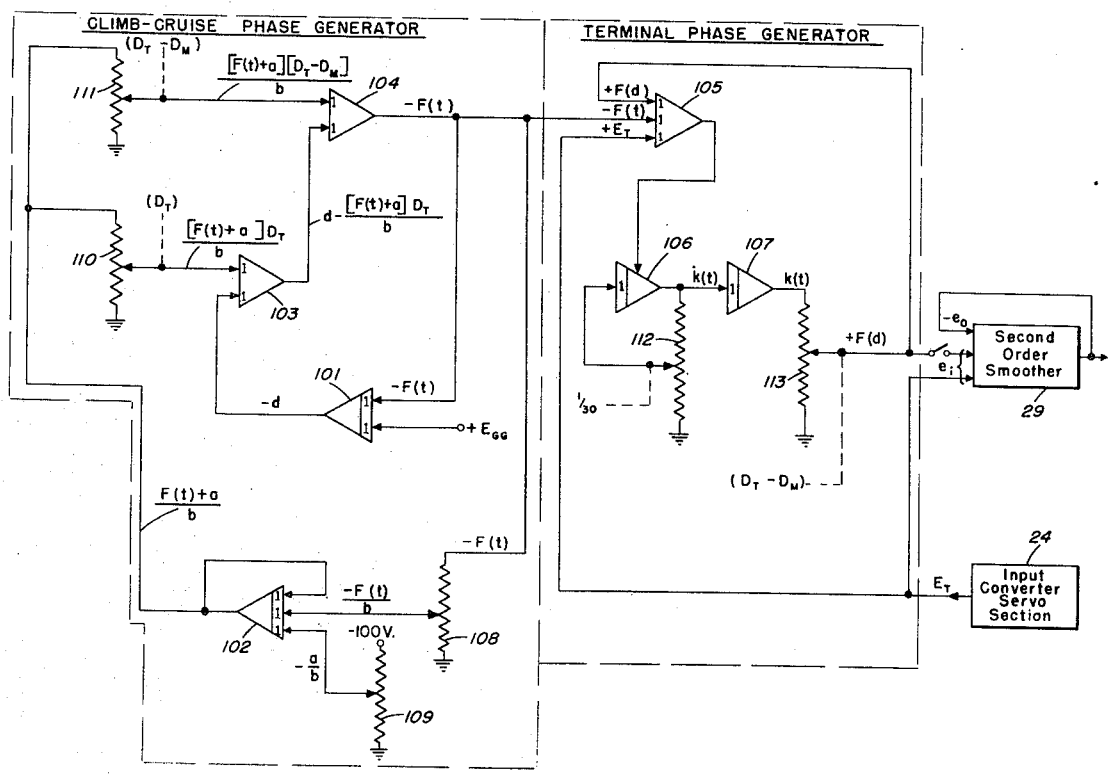

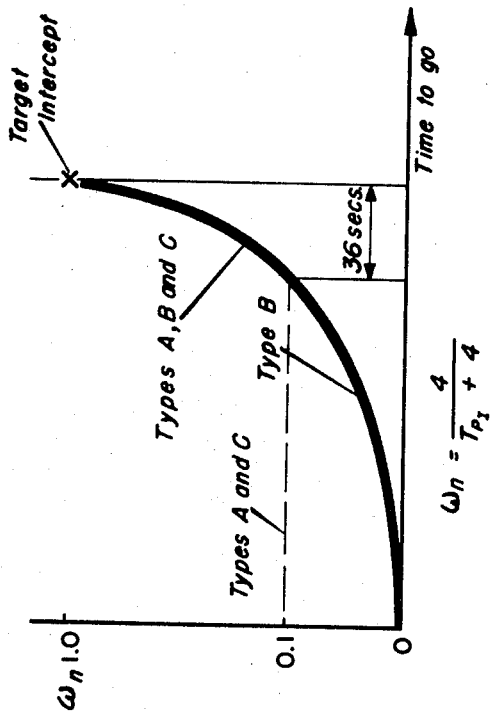

ns. 38,408 and 86,267, previously mentioned, in combination with a novel and inventive driving function generator for a long range program, the combined system being capable of guiding beam-riding missiles along prescribed trajectories most suited to considerations of missile performance characteristics and target threat, and performing in a manner which insures maximum efficiency and missile range through the smoothing of input radar data and choice of flight cruising parameters.

LONG RANGE MISSILE PROGRAMMER

The present invention relates generally to improvements in missile guidance systems and the like and more particularly to a new and improved guidance system for beam-riding missiles wherein a single system capable of multiple flight course programming is rendered adaptable to long range trajectories effecting minimization of missile fuel consumption, maximization of missile range and increased probability of successful target kill.

In the field of missile guidance system development, it has been the general practice to employ ground computing devices in conjuntction with cooperating guidance transmitters to guide various beam-riding missiles to their targets. Although such devices have generally served their purpose, they have not proved entirely satisfactory under all conditions of service and operation. In this regard, primary difficulties encountered have dealt with the minimization of deleterious effects of noisy radar input data upon both the computer and resulting programmed missile trajectory, with consequent effects upon missile fuel consumption, missile range, and probability of collision of the missile with the target. Hence, those concerned with the development of missiles guidance systems have long recognized the need for a guidance system capable of such wide adaptability as to enable rapid and precise change-over from one type of program trajectory to some other more desirable program trajectory, which might be made dependent upon any desired set of input parameters such as range, angle, or any combination thereof, and which would simultaneously avoid all of the foregoing difficulties commonly encountered by such systems.

Many of the foregoing difficulties were circumvented by means of the Multiple Flight Course Second Order Programmer disclosed in related copending application Ser. No. 38,408, filed June 23, 1960, U.S. Pat. No. 3,169,727 by Irvin H. Schroader, Melvin E. Hosea, and Leo C. Miller and the improvement therein set forth in copending application Ser. No. 86,267 filed Jan. 31, 1961 U.S. Pat. No. 3,164,339, for Missile Programmer Coast Mode Provision by Irvin H. Schoader, Melvin E. Hosea, Leo C. Miller and Frederick F. Hiltz. However effective these devices were in improving the accuracy, versatility, and economy of previous missile guidance systems, a critical problem yet remained unresolved by workers in the art. This was the requirement for a long range missile program having initial flight trajectory phases, independent of target position, so designed as to minimize fuel consumption and thereby enhance trajectory missile range, and capable of providing smooth transition among the various trajectory flight phases. Such a long range program would insure maximum versatility for any specific missile type against a large variety of target configurations and locations, and would minimize the extent to which a wide variety of stock missiles having different performance characteristics would be required.

The general purpose of this invention, therefore, is to provide a missile programmer which embraces substantially all the advantages of previously employed missile guidance systems and yet possesses none of the aforedescribed disadvantages. To attain the latter, the instant invention contemplates, among other things, provision of a versatile missile programming system including a terminal second order programmer smoothing stage and coast provision of the types set forth in copending applications Ser. Nos. 38,408 and 86,267, previously mentioned, in combination with a novel and inventive driving function generator for a long range program, the combined system being capable of guiding beam-riding missiles along prescribed trajectories most suited to considerations of missile performance characteristics and target threat, and performing in a manner which insures maximum efficiency and missile range through the smoothing of input radar data and choice of flight cruising parameters.

The missile guidance system of the instant invention further contemplates provision of a second order programmer computing and smoothing section which acts upon input data so as to cause the elevation and azimuth of the guidance transmitter to approach the elevation and azimuth of the target, prior to target intercept, in accordance with a prescribed second order equation, the input data driving function to the elevation portion of the computing section being of a nature, in accordance with the instant invention, to enable a maximum efficiency long range flight program to be followed. The driving function generator of the instant invention is intended solely for programming in the elevation plane alone, since other simpler flight programs are suitable for programming in the azimuth plane which requires only that a smooth transition be effected. In this regard, therefore, the instant invention modifies the Multiple Flight Course Second Order Programmer device set forth in copending applications Ser. Nos. 38,408 and 86,267 by providing a new and improved driving function generator for the elevation portion of the computing section set forth in the latter copending applications, this new and improved driving function generator serving to greatly enhance the range capabilities, and hence the versatility, of the entire second order programming system.

Accordingly, one object of the present invention is the provision of a new and improved missile guidance system.

Another object of the instant invention is the provision of a novel missile guidance system capable of programming a missile efficiently over a long range program.

A further object is to provide a new and improved missile guidance system capable of quick changeover from a long range guidance program to one of shorter range.

Still another object is to provide a new and improved missile programmer which minimizes missile fuel consumption, increases missile range, and insures maximum probability of target kill.

Yet another object of the instant invention is the provision of a new and improved missile programming device capable of causing missile position data to approach target position data in a preferred manner to effect maximum efficiency and probability of target kill with minimum drag upon the missile during flight.

A still further object of the present invention is to provide a new and improved missile guidance system incorporating a driving function generator capable of effecting long range trajectory programming.

Another object of the present invention is the provision of an improved function generator for a second order smoothing programmer which will be capable of programming a missile over a long range trajectory.

Other objects and many of the attendant advantages of this invention will be readily appreciated as the same becomes better understood by reference to the following detailed description when considered in connection with the accompanying drawings, wherein:

FIG. 6 illustrates in tabular form integrator status within the programmer at various significant times during the long range flight program; and FIG. 7 is a graph illustrating a manner in which guidance sensitivity within the second order smoother circuitry may be varied during typical flight programs.

Figure 1:
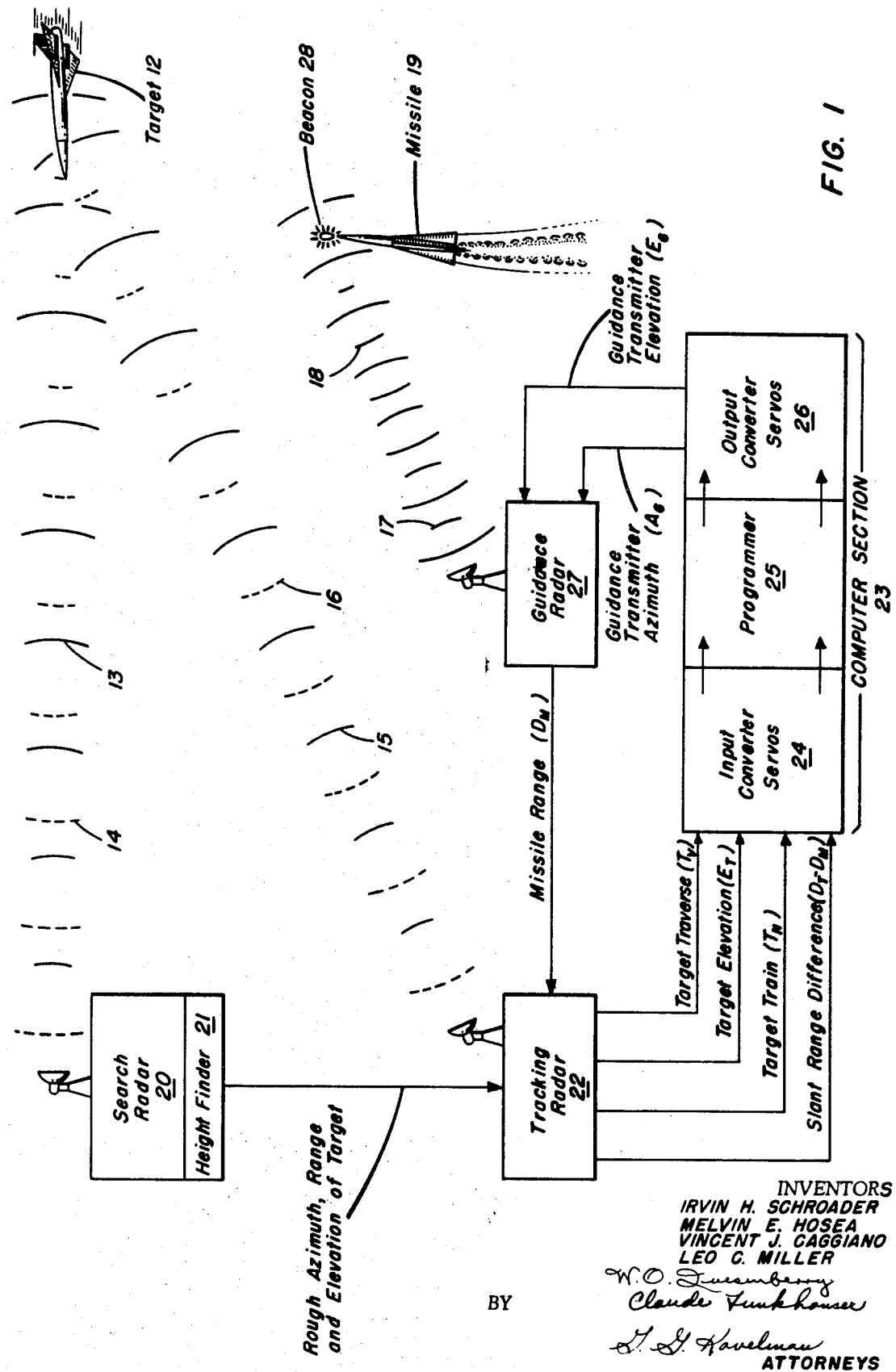
FIG. 1 is a schematic representation by block diagram of a typical missile guidance and control system capable of embodying the device of the instant invention.

Multiple flight course second order programmers capable of utilizing the long range driving function generator of the instant invention comprise basically an electronic second order smoothing analog computer in combination with a series of servo systems and input and output radar systems, including all necessary power, cabling and switching necessary to implement the latter. Such systems are capable of accepting radar data in synchro form and, through the use of suitable follow-up servo systems, of converting such radar synchro data to D.C. signal form for utilization by an electronic analog programming computer section to provide required missile flight trajectories in accordance with prescribed programming equations to be hereinafter more fully described. Such systems are also capable of converting the computed flight program, in both azimuth and elevation, from conventional D.C. signal output information form, emanating from the computer, into synchro form which may then be conveyed to the guidance transmitter radars to command the latter into proper position. In actual practice, the flexibility of such guidance system units is even further enhanced through the wide use, wherever possible, of multiple patch panels, the latter being classified in accordance with functions handled, such as synchro data, D.C. function, etc.

Typical of desired firing and flight trajectory conditions for a modern guided missile are that the missile be fired at a relatively high launcher elevation angle, that the missile ascend as rapidly as possible to a high altitude, and that the missile cruise as long as possible at this high altitude for maximum engine efficiency, without compromising the ability of the missile to intercept the target. As the missile approaches the vicinity of its designated target, the missile must be programmed into a terminal phase, involving a maneuver within the acceleration capabilities of the missile, to produce either a direct target hit or a near miss accomplishing target kill.

The instant invention contemplates the manipulation of various input parameters within a novel function generator device in accordance with generalized programming equations, to produce an output driving function signal for direction as input to a second order smoothing computer. The input data is manipulated within the driving function generator in such a manner as to produce output voltages capable of programming a beam-riding missile through a series of flight phases designated as the climb phase, the cruise phase, and the terminal phase. The driving function generator of the instant invention handles input data, by means of a prescribed series of operations, to select for any specific missile type climb and cruise phases most suited to maximum efficiency and missile range for that missile. The function generator also initiates a terminal program phase at the proper time and of the proper trajectory type to insure maximum probability of target kill for the specific missile riding the guidance beam. Moreover, the novel driving function generator of the instant invention also accomplishes proper program transition from the climb phase to the cruise phase and from the cruise phase to the terminal guidance phase so as to minimize effects of such transition maneuvers upon the missile being guided and thereby at all times maintain guidance values of position parameters within the acceleration capabilities of the missile. Long range trajectories programmed by means of a second order missile flight programmer incorporating the new and improved driving function generator of the instant invention include climb and cruise phases which are fixed in their characteristics and independent of any target parameters, with the exception that the duration of the cruise phase, which culminates in initiation of a terminal guidance phase, is limited in duration by the predicted time to go before target intercept by the missile.

In the aforementioned copending application Ser. No. 38,408, for Multiple Flight Course Second Order Missile Programmer, two types of illustrative program trajectories within the scope of the second order programming computer were described. These sample flight programs were designated type A and type B. The type A program was specifically designed for use with missiles which are total beam-riders, that is, missiles which ride guidance beams all the way to their respective targets, whereas the type B program is primarily adapted for use in conjunction with a partially beam-riding missile which rides a guidance beam only to within close proximity of the target and thereafter "homes in" on the target by means of guidance devices which may be wholly within the missile itself and independent of any ground control. The novel function generator of the instant invention enables a new and longer range missile program to be obtained with the second order programming computer set forth in the aforementioned copending application Ser. No. 38,408. The latter long range program is, for purposes of illustration, arbitrarily designated as a type C program and is designed for use solely in elevation plane programming, any other standard program, such as the type A or type B, being suitable for azimuth plane programming so long as a smooth transition is accomplished.

Referring now to the drawings, which illustrate one embodiment of the invention, there is shown in FIG. 1 a schematic representation by block diagram of a complete missile guidance and control system capable of programming a variety of missile flight trajectories, including that of the type C program, best suited to target configuration and missile performance characteristics.

FIG. 1 shows a search radar 20, incorporating a separate height finder 21, which sends out a radar search beam 13 to a target 12 and in turn receives a reflected signal 14 from the target. Many types of search radar instrumentation are suitable for utilization in carrying out the latter function, including search radars having built in height finders or those which incorporate such units separately. The output of the search radar 20 and height finder 21 consists of information relating to rough values of target azimuth and range and an even rougher value of target elevation. The latter output data is then conveyed as input information to a tracking radar 22, which may take a great variety of forms but, for purposes of illustration, is shown here as incorporating a three coordinate system utilizing train, traverse, and elevation axes.

The target azimuth, target range and target elevation information from the search radar 20 and height finder 21 enables the operator of the tracking radar 22 to either actually "lock on" the target 12 or to throw the tracking radar into "search" operation, which is essentially a scan raster of plus or minus a discrete number of degrees about a position which is believed by the operator of the tracking radar 22 to be the approximate target position as indicated by the rough information received from the search radar system. Other modes of radar systems feeding the tracking radar 22 might include such systems as the air force "SAGE" concentrated network of defense radars.

The tracking radar 22 transmits its own radar beam 15 to the target 12 and receives a reflection 16 therefrom. The output data from the tracking radar 22 is shown as consisting of target elevation, target train, target traverse, and slant range from tracking radar 22 to the target 12. The latter output information from tracking radar 22 is derived for further use through synchro devices physically located at the tracking radar unit itself. Shaft rotations about the various axes of the tracking radar 22 are converted by means of such synchro devices to synchro signals, three wire lines being conventionally embodied for each synchro, to provide outputs therefrom which are directly proportional to the number of degrees of radar shaft rotation from an established zero reference position.

The synchro output data from the tracking radar 22 is in turn fed to a computer section 23. The latter tracking radar data is first directed to the input converter servo section 24 of the computer 23 wherein the synchro input information is converted by means of servomechanism devices to electrical signals in the form of D.C. voltages proportional to the original radar shaft rotations from which the input synchro signals were derived. Such D.C. voltage signal form is required for use by the programmer section 25 of the computer 23. The programmer section 25 utilizes the latter D.C. voltage outputs from the input converter servos as electrical voltage inputs to a computing section which manipulates such input voltages on the basis of prescribed generalized trajectory equations and produces D.C. output voltages which are then fed to an output converter servo section 26.

The output converter servo section 26 of computer 23 reconverts the D.C. output voltage signals from the programmer section 25 to synchro signal output form for transmission to and utilization by the guidance radar transmitters denoted generally as 27 in FIG. 1 of the drawings. The latter guidance radar transmitters 27 are physically located near the tracking and search radars 22 and 20, respectively, or at least within a few hundred feet of the tracking and search radars to prevent the introduction of severe parallax errors.

The guidance radar 27 transmits a radar signal 17 to the missile 19, but only in a single direction, that is, guidance radar 27 receives absolutely no reflected signal from the missile. The major distinction between the guidance radar transmitters 27 and the tracking radars are that the guidance transmitters are commanded into position by the output elevation and azimuth signals from the ground computer section 23. In the illustrated embodiment, however, the guidance radar transmitter 27 does track in range for the type A and type C programs. In contrast to the operation of tracking radar 22, the tracking accomplished by the guidance transmitter is not carried out by receiving a signal from the missile constituting a reflection of an original signal generated in the guidance transmitter itself. On the contrary, missiles utilizing the type A and type C program trajectories carry a beacon 28 incorporated into the missile and which is triggered by the guidance beam 17 from the guidance transmitter 27 to generate a beacon signal 18 of its own. The latter beacon signal 18 is directed from the missile 19 to the guidance transmitter 27, the time of delay of arrival of the beacon signal at the guidance transmitter being a measure of the slant range to the missile.

For the type B program set forth in the aforementioned copending application Ser. No. 38,408, which program is designed for utilization solely by missiles which incorporate separate homing systems, the program flight trajectory is not dependent upon input information to the computer section 23 relating to the difference between target slant range and missile slant range, and hence, the guidance transmitter 27 is not required to track in range for such a program.

For the type A and type C programs, therefore, the missile slant range information received by the guidance transmitter 27 is fed back into the tracking radar 22 to enable the latter unit to direct an output to the computer section 23 which is the difference between slant range to the target and slant range to the missile, whereas for the type B program, with "homing," there is no tracking in range by the guidance transmitter 27 nor any feedback of such information from the guidance transmitter to the tracking radar 22, and, therefore, in the latter instance the output of the tracking radar 22 would be simply slant range to the target.

Missiles utilizing the multiple flight course programmer of the instant invention must, of necessity, be beam-riders. A missile 19 of this type is captured by the radar beam 17 emanating from the guidance transmitter 27 so that the missile 19 is caused to follow the beam as the beam moves in accordance with the programmed flight trajectory. Servomechanism devices within the missile itself steer the missile in accordance with the transmitted guidance signals so that the missile 19 is caused to always remain within the guidance beam after capture, provided the guidance beam moves in such a manner that the missile capabilities of linear velocity and lateral acceleration are not exceeded.

In actual operation, prior to launching, the operator of the missile guidance and control system elects, in accordance with the nature of the missile to be fired, a suitable program trajectory i.e., for a long range target the type C program of the instant invention would be chosen. The operator then proceeds to orient various switches in the guidance transmitter in accordance with the program choice made, e.g., for tracking in missile range or not by the guidance transmitter, and simultaneously operates switches in the programmer section 25 of computer 23 to select proper constants and input data channels for the chosen program.

As previously outlined, typical requirements for a modern guided missile are that the missile be fired at a relatively high launcher elevation angle, rapidly ascend to a high altitude, cruise as long as possible at this altitude for maximum engine efficiency, and then dive towards the target in a maneuver within the acceleration capabilities of the missile, to produce a target kill. Two types of trajectories, suitable for these purposes, have been previously evolved and described. The type A program was designed for a totally beam riding missile carrying a beacon capable of relaying missile range information to the guidance transmitter, in the manner utilized for the type C program of the instant invention, and the type B program was designed for a partially beam-riding missile, without beacon, which utilizes separate homing systems to intercept the target.

After the missile is initially fired at a relatively high launcher elevation angle, a discrete period of time elapses before capture of the missile by the guidance beam is accomplished. Thereafter, $E_G$, the elevation of the guidance transmitter, must approach $E_T$, the elevation of the target, in accordance with prescribed programming equations.

Figure 4:
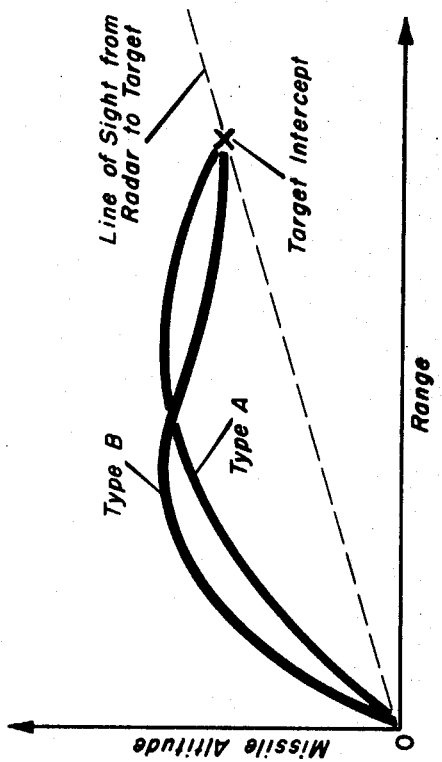
FIG. 4 is illustrative of typical short range flight trajectories.

FIG. 4 of the drawings illustrates the trajectory shapes found desirable in those instances where the type A and type B programs are utilized. It will be noted from FIG. 4 that, whereas the type A program causes the missile to intercept the target in a direct collision course, the type B program causes the missile to approach asymtotically to the line of sight from the tracking radar to the target prior to collision. Both the type A and type B programs disclosed in the aforementioned copending application Ser. No. 38,408 are of the medium range variety, that is, they are unsuited to long range trajectories. In this regard, the instant invention provides a novel driving function generator capable of directing a new type of input to the second order programming computer to enable an output trajectory therefrom suitable for long range flight programs.

For the purpose of analyzing and specifying missile performance during the type C program, as controlled and guided by a novel second order programming computer system, it is necessary to first define the flight trajectory, as represented by the output data emanating from the computer section, in terms of specific mathematical system equations and specified input parameters to the computer section utilizing the latter equations. The system equations utilized by the second order programmer have been previously disclosed in copending application Ser. No. 38,408 to be $$e_o = \int_{t=G}^{t=P} e_i dt \qquad (1)$$

and $$\dot{e}_o = -2\omega_n(e_o - e_i) - \sigma \int_{t=G}^{t=P} \omega_n^2(e_o - e_i)dt + \text{constant} \qquad (2)$$

where $e_o$ is the output data from said computer,
$e_i$ is the input data to said computer,
$\dot{e}_o$ is the first derivative of $e_o$, $\omega_n$ is the gain sensitivity factor of the computer,
$\sigma$ is a constant,
$P$ is the present time, and
$G$ is the time of guidance initiation, An important feature of the second order computer circuitry utilized for computing the various program trajectories in accordance with the above equations is the manner in which the value of $\omega_n$, the gain sensitivity factor, is varied. A low value of $\omega_n$ allows $e_o$ to change only slowly and to be relatively insensitive to changes in $e_i$, the input data. On the other hand, a high value of $\omega_n$ allows $e_o$ to change rapidly and to be more sensitive to fluxuation in $e_i$. Therefore, the manner in which $\omega_n$, the gain sensitivity factor is programmed is of prime importance insofar as the versatility and smoothing efficiency of the second order programming computer system is concerned.

It has been determined empirically that adequate smoothing of noisy input data and desired flight trajectory accuracy will be realized if the gain sensitivity factor, $\omega_n$, is programmed in accordance with the equation $$\omega_n = c/(Tpi + c) \qquad (3)$$

where $Tpi$ is the time from present to intercept and $c$ is a constant. Such an empirical programming equation for $\omega_n$ insures values of gain sensitivity lying between zero and unity and eliminates the situation where a gain sensitivity of infinity would be required, the latter case being one which would obtain if the gain sensitivity constant $c$ were omitted from equation (3). The specific values of the constant $c$ in equation (3) for $\omega_n$ is generally determined for any particular missile by means of simulator analysis, values of $c$ between 3.5 and 4.5 being fairly common for typical modern missiles presently in use. The value of $c$, however, may assume any desired form for presently existing or subsequently developed future missiles and, therefore, the variability of c-values provides for a wide range of adaptability. By way of example, FIG. 7 of the drawings illustrates the manner in which $\omega_n$, the gain sensitivity factor, is varied in accordance with equation (3) for a value of $c = 4$.

Figure 5:
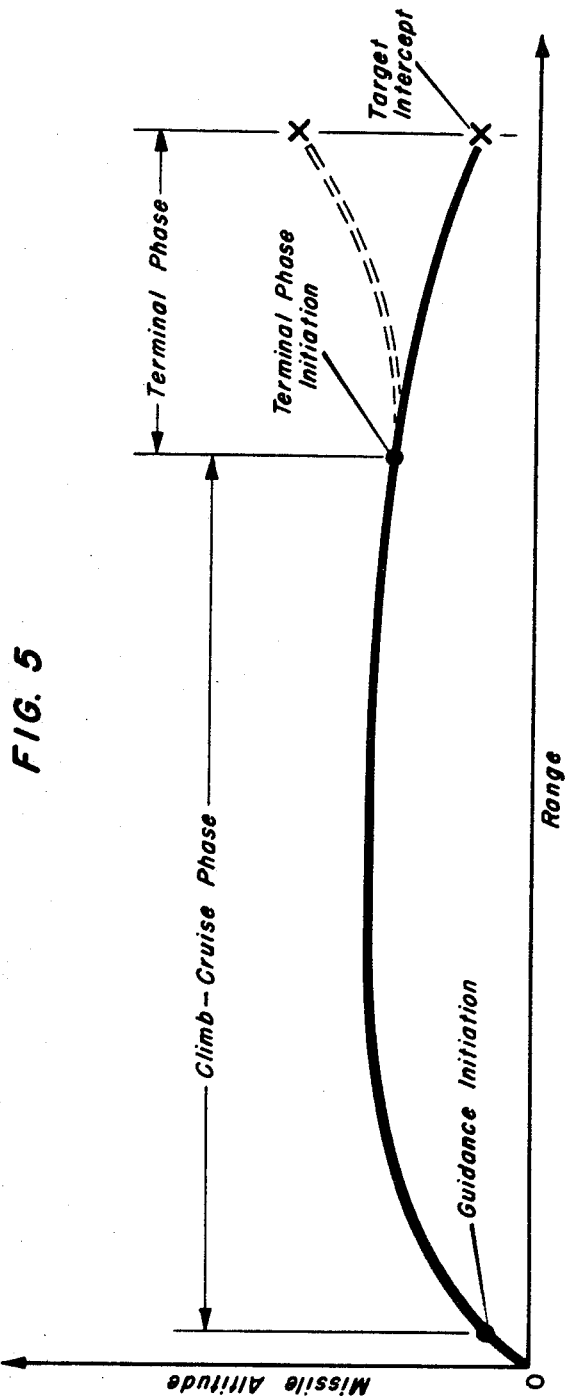
FIG. 5 illustrates a long range missile flight trajectory obtainable in accordance with the instant invention.

The type C program of the instant invention is depicted in FIG. 5 of the drawings. The latter trajectory is shown to comprise climb and cruise phases and a terminal guidance phase. Essentially, the climb and cruise phases are combined into a single phase which is substantially independent of target position and effects a smooth transition from the climb phase to the cruise phase. The climb trajectory is fixed and does not depend upon the target position at all. The cruise phase stretches or shrinks in length, that is, the cruise phase has a varying period of duration to suit target parameters, and is essentially a trajectory at constant cruising altitude, for maximum efficiency, compensated by a slight droop to account for the earth's curvature. The type C program also enables a smooth transition from the combined climb-cruise phase to the terminal guidance phase at the point of terminal guidance initiation. At this latter point, it was required that not only missile positions on both sides of the transition point, but rates of change of position as well, had to match in order to avoid unreasonable maneuvers on the part of the missile and the introduction of instability into the missile flight control system. The resulting type C program shown in FIG. 5 of the drawings greatly extends the range capabilities of missiles which would normally be capable of using the type A or type B programs only for targets at medium range. One additional distinction, however, remains in comparing the type C program with the trajectories of the type A and type B varieties. The type C program is utilized solely in the elevation plane and uses any other standard transition in the azimuth plane such as the type A or type B azimuth programs. On the other hand, whenever the type A or type B programs are utilized in the elevation plane for medium range targets the same type programs are utilized in the azimuth planes as well.

Figure 2:
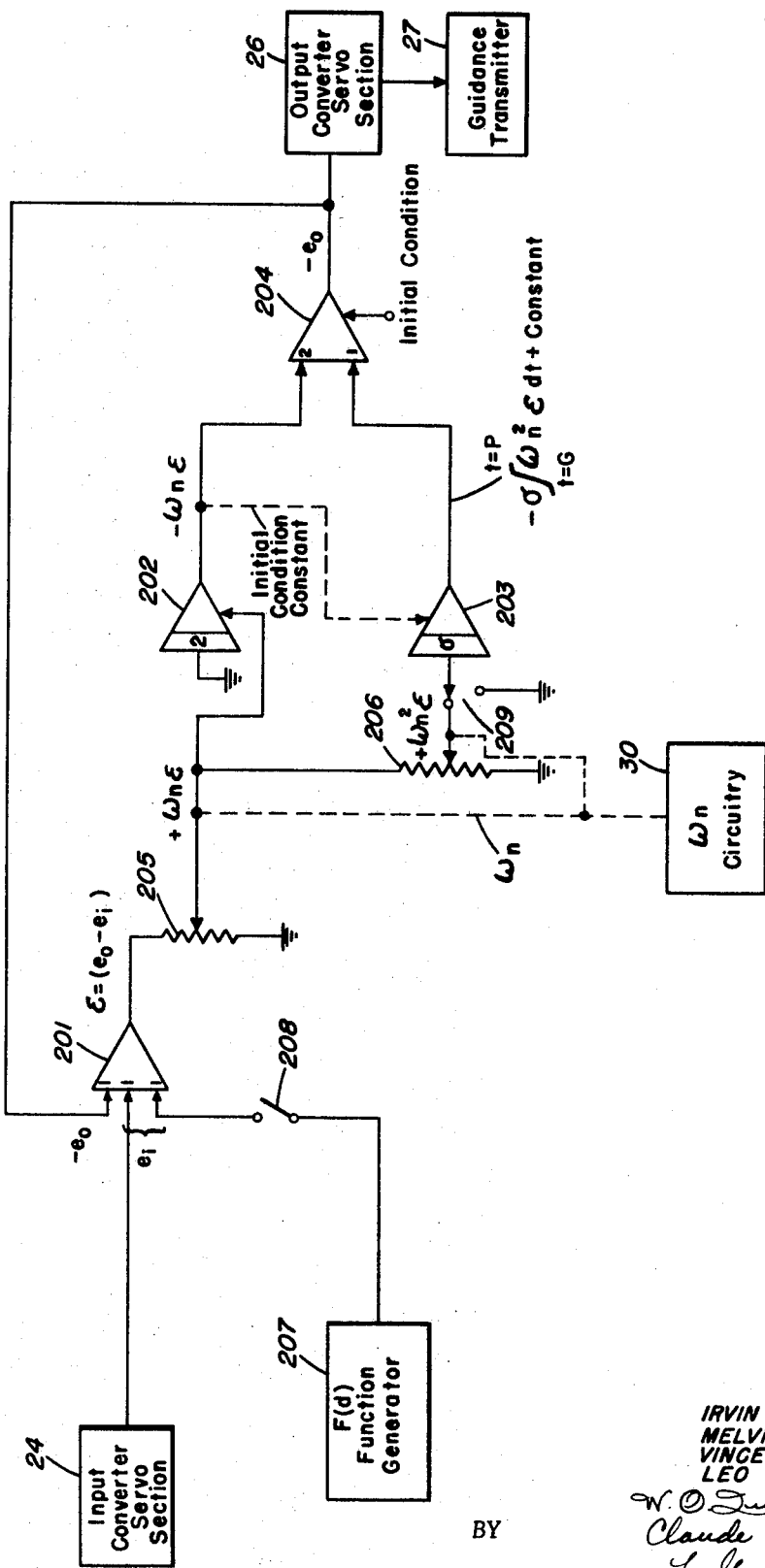
FIG. 2 illustrates the second order smoother section to which output information from the function generator of the instant invention is directed.

Referring now to FIG. 2 of the drawings, which illustrate in combined block diagram and schematic form a long range programmer of the second order type, the instant invention is shown to comprise a new and improved driving function generator 207 whose output is directed as an input to an input amplifier 201 of a second order programmer computing and smoothing network, to enable the latter to produce output elevation guidance signals capable of directing a beam-riding missile in a flight trajectory involving minimum fuel consumption and drag upon the missile for maximum efficiency and range. Additional parameters are derived from an input converter servo section 24 and are also directed as inputs to the second order computer input amplifier 201. The second order programming computer and smoother is shown comprising the series of four amplifiers indicated as 201, 202, 203, and 204, respectively, and incorporating coast mode provisions, all of which have been fully disclosed and claimed in the aforementioned copending applications Ser. Nos. 38,408 and 86,267 . These features will be only briefly outlined here, since the invention is deemed to reside primarily in the new and improved function generator which enables the second order programming computer and smoother to program a long range type C trajectory.

Amplifier 201 is a conventional D.C. analog type summing amplifier, well known in the art and commercially available. Amplifiers 202, 203 and 204 are conventional integrating amplifiers with initial-condition circuits. The combined input to integrating amplifier 204 is $\dot{e}_o$, the first derivative of $e_o$, the output of integrating amplifier 204 being $-e_o$. The latter quantity is directed to the output converter servo section 26 prior to transmission to the guidance transmitter 27 and is also simultaneously fed back as an additional input to computer input amplifier 201 which receives the input data $e_i$, the nature of which is determined by the desired output flight trajectory program. The input to amplifier 201 is thus $e_i - e_o$ and the output, in view of the inherent 180° phase shift which takes place in the amplifier 201 and the resulting reversal in sign, is therefore $e_o - e_i$ or $\epsilon$. For purposes of solving equation (2), the quantities $\omega_n \epsilon$ and $\omega_n^2 \epsilon$ must be obtained, and these operations are accomplished as described below.

The output of amplifier 201, which is $\epsilon$, is fed to a potentiometer 205, the shaft position of which is equal in value to $\omega_n$, the gain sensitivity factor. Hence, since the input to potentiometer 205 is $\epsilon$, the output therefrom is equal to $\omega_n$ multiplied by $\epsilon$ or $\omega_n \epsilon$. The latter quantity is fed as an input to the initial-condition circuit of integrating amplifier 202 and is also simultaneously directed to a second potentiometer 206 whose shaft position is like-wise adjusted to the value of $\omega_n$. The input to integrating amplifier 202 is short-circuited to ground. The output voltage from the potentiometer 206 is $\omega_n^2 \epsilon$, the latter voltage being fed directly as input to integrating amplifier 203. A switch 209 is also provided in the input circuit to integrating amplifier 203 to enable switching from the $\omega_n^2 \epsilon$ input to a terminal which short-circuits the input to ground.

The mechanical output proportional to $\omega_n$, which is utilized to control the shaft positions of potentiometers 205 and 206, is obtained from an $\omega_n$ circuitry section 30 which programs the gain sensitivity factor $\omega_n$ in accordance with equation (3) and is fully disclosed in related copending application, Ser. No. 38,408, filed 23 June 1960, for Multiple Flight Course Second Order Programmer, by Irvin H. Schroader, Melvin E. Hosea and Leo C. Miller. For purposes of the instant discussion, it will suffice to say that $\omega_n$, the gain sensitivity factor, is limited to values between zero and unity, in accordance with equation (3), and since the shaft positions of both potentiometers 205 and 206 are at all times set to the value of $\omega_n$, therefore the respective outputs from the latter potentiometers are functions of the input voltages across the potentiometers and directly proportional to $\omega_n$. It is realized of course that the use of the second potentiometer 206 connected in the manner shown to obtain $\omega_n^2$ is merely a close approximation method since the effect of the second potentiometer 206 is to load the first potentiometer 205. Hence, to increase the accuracy of such an approximation approach, the second potentiometer 206 is supplied with a somewhat higher value of total resistance then that of the first potentiometer 205.

It has been established that the input to the initial-condition circuit of integrating amplifier 202 is $\omega_n \epsilon$ and the input to integrating amplifier 203 is $\omega_n^2 \epsilon$. Passage of the signal through the initial-condition circuit of amplifier 202 merely serves to provide a reversal in sign through inherent phase shift. Therefore, the output from integrating amplifier 202 is $-\omega_n \epsilon$. The gain of integrating amplifier 203 is adjusted to provide multiplication by the factor $\sigma$ in equation (2). Thus, the output of integrating amplifier 203 is equal to $$-\sigma \int_{t=G}^{t=P} \omega_n^2 \epsilon \, dt + \text{constant.}$$

The output from integrating amplifier 202 is directed to one input of integrating amplifier 204 while the output of integrating amplifier 203 is directed to a second input of the summing integrator 204. The gain of the input channel receiving the $-\omega_n \epsilon$ input is adjusted to a value of two to provide an equivalent input of $-2\omega_n \epsilon$. Thus, the input circuit to integrating amplifier 204 consists essentially of the outputs of amplifiers 202 and 203 modified by input gains in respective channels of the integrator 204, the sum of these terms being equal to the first derivative of $e_o$, or $\dot{e}_o$, in accordance with equation (2). Hence, the output from integrating amplifier 204 is $-e_o$ which is directed as feedback to one input channel of amplifier 201, and simultaneously directed to the output converter servo section 26 for subsequent conveyance to the guidance transmitter 27.

The coast mode provisions provided in integrating amplifiers 202 and 203 enable integrating amplifier 202 to be switched from the "initial-condition" state to the "compute" state and simultaneously to switch the input to integrating amplifier 203, which is already in the "compute" state, from the $\omega_n^2 \epsilon$ input condition to the short-circuit to ground condition, both of these operations being accomplished by suitable relays upon loss of target track by ground radars. The coast mode provisions are set forth in detail in copending application Ser. No. 86,267 filed Jan. 31, 1961, for Missile Programmer Coast Mode Provision, by Irvin H. Schroader, Melvin E. Hosea, Leo C. Miller and Frederick F. Hiltz.

It should be noted that the second order computing and smoothing circuitry described above allows $e_o$ to gradually approach $e_i$, until actual intercept with the target, in a manner and degree dependent upon the rapidity with which $e_o$ can change, the latter being controlled by the magnitude of the gain sensitivity factor $\omega_n$ which, in turn, controls the shaft position settings of the potentiometers 205 and 206. If $\omega_n$ is allowed to reach its maximum value of unity, then $e_o$ can approach $e_i$ very rapidly since the feedback loop gain is very high, whereas if the $\omega_n$ shaft position settings of potentiometers 205 and 206 are near their lower limits, that is, with $\omega_n$ at a value of considerably less unity, then the feedback loop gain is very low and $e_o$ will follow input data $e_i$ rather slowly and with a substantial lag. One purpose, therefore, of the second order programming computer is to cause $e_o$ to approach $e_i$ from an initial value of $e_o$ and proceed through a transient phase whose nature and time duration is controlled by the manner in which the gain sensitivity factor, $\omega_n$, is programmed. A large value of $\omega_n$ increases the tightness with which $e_o$ can follow $e_i$ and reduces the transient error due to rapid variation in input voltages. On the other hand, a low value of $\omega_n$ provides heavy smoothing of noisy radar data. In practice, therefore, the manner of programming $\omega_n$ in accordance with equation (3) is a compromise between the suppression of noise on the input data $e_i$, to prevent vibration of the missile wing flaps and consequent increased drag and possible damage to missile wing servos, and maximum probability of target kill. Thus, $107_n$ is programmed in time in such a manner as to enable $e_o$ to follow $e_i$ to an increasingly close tolerance as actual collision with the target approaches, a large value of $\omega_n$ being utilized to increase the tightness of following during the latter portion of programmed flight when the missile is close to the target, whereas a small value of $\omega_n$ is utilized for the initial portion of the program to provide heavy smoothing of noisy radar input data.

The preceeding has been a discussion of the basic second order programmer computing and smoothing network. By varying the nature of the input data $e_i$ to the computer input amplifier 201, the nature of the output flight trajectories represented by $e_o$ can be molded to conform with any one of a number of programs. The type A and type B programs and methods for obtaining the latter have been previously disclosed in detail in copending application Ser. No. 38,408. The long range type C program and the function generator necessary for obtaining the latter program form the basis of the instant invention and are next discribed.

The shape of the type C long range program trajectory is illustrated in FIG. 5 of the drawings. The type C trajectory is shown to comprise a combined climb-cruise phase wherein the missile is initially launched at a high launcher elevation angle, is captured by the beam emanating from the guidance transmitter, continues to rise in a climb path which has a smooth transition into a maximum efficiency cruise phase of approximately constant altitude with slight droop to account for the earth's curvature, and at a prescribed point determined by the rate at which the missile is closing on the target, a smooth transition is accomplished to a terminal phase ultimately leading to target intercept.

Referring again to FIG. 2 of the drawings, the nature of the output trajectory signals $e_o$ from the second order programming computer and smoother is governed by the nature of the input data function $e_i$ to the computer input amplifier 201. As previously set forth in copending application Ser. No. 38,408, the nature of the input data function for the type A and type B medium range flight trajectories are $$e_i = E_T \tag{4}$$

for the type B program and $$e_i = E_T + K(D_T - D_M) \tag{5}$$

for the type A program where $E_T$ = Elevation of the Target
$D_T$ = Slant Range to the Target
$D_M$ = Slant Range to the Missile
$K$ = Programming constant Basically, the long range type C program is similar to the type A medium range program and requires an input driving function to input amplifier 201 of the second order smoothing computer which may be broadly described as follows:

$$e_i = E_T + (t)[D_T - D_M] \tag{6}$$

$$e_i = E_T + F(d) \tag{7}$$

where $K(t)$ = time varying programming factor
and $F(d)$ = output of driving function generator
$= k(t)[D_T - D_M]$ A comparison of equation (6) for the type C program with equation (5) for the type A program, reveals that in order to realize the long range type C program, the co-efficient of the $D_t - D_M$ term must be a suitable function of time $k(t)$, rather than a constant $K$ as utilized in the type A program. By varying the nature of the programming factor $k(t)$, the nature of the input data function $e_i$ to the second order computer can be tailored to program the missile through the climb-cruise phase and the terminal phase.

A major requirement of the long range type C program is the smooth transition between the various flight phases of the program. The latter is necessary to avoid the introduction of heavy transients and consequent instability in the guidance system and also to prevent unnecessarily hard maneuvers on the part of the missile with inherent resulting loss in efficiency and range capabilities. In this regard, therefore, the following stringent requirements in addition to that of smooth transition between the climb and cruise phases are required:

$$k_{cc} = k_T \tag{8}$$

$$\dot{k}_{cc} = \dot{k}_T \tag{9}$$

where
$k_{cc}$ = value of $k(t)$ at end of climb-cruise phase,
$k_T$ = value of $k(t)$ at initiation of terminal phase,
$\dot{k}_{cc} = d(k_{cc})/dt$ and $\dot{k}_T = d(k_I)/dt$ The manner in which $k(t)$ is varied in order to accomplish the desired flight stages for the long range type C program is described below.

The climb and cruise phases are combined into a single transient with inherent smooth transition in accordance with the requirements of equations (8) and (9). The manner in which $k(t)$ is varied for the climb-cruise phase has been empirically determined $$k(t) = \int_G^P [F(d) + E_T - F(t)]dt, \tag{10}$$

where $$F(t) = (bd - a\,D_M)/(b + D_M) \tag{11}$$

and $F(t)$ = Program Variable defining the combined climb-cruise phase,
$P$ = present time,
$G$ = time of guidance initiation,
$a, b, d$ = Constants to be specified.

The resulting climb-cruise phase, as illustrated in FIG. 5 of the drawings, includes a climb trajectory, which is independent of target parameters, and a cruise phase which is essentially at constant altitude with slight droop to compensate for the earth's curvature and which varies in period of duration in accordance with the rate at which the missile and target are closing in range. In other words, the duration of the cruise phase, which terminates in terminal phase initiation, is dependent upon $D_T - D_M$ having diminished to a specified value.

To obtain the terminal phase flight portion of the type C long range program trajectory, the value of $k(t)$ at terminal phase initiation is frozen at the value it had at the end of the climb-cruise phase and is thereafter allowed to decay exponentially over a specified time interval. The resulting terminal phase, therefore, is a modified form of the type A program, differing only in that the coefficient of the $D_T - D_M$ term is a slowly varying function of time rather than the constant $k$ in equation (5).

It will be noted, referring to FIG. 5 of the drawings, that the terminal phase is not limited to a dive upon the target from above, but can also rise from the cruise level and intercept high altitude targets from below. The manner in which $k(t)$ is varied during the terminal phase to satisfy the above stated condition has been determined empirically to be $$k(t) = k_T + 30\,k\sigma_T (1 - e[-T_{TP}/30\,]) \tag{12}$$

where $T_{TP}$ = Time from terminal phase initiation to present.

It will be noted from equation (12) that, at the beginning of the terminal phase, the second term in equation (12) reduces to zero and, therefore, equation (8) is satisfied. Taking the first derivatives of both sides of equation (12) will also reveal that the requirement set forth in equation (9) is also satisfied.

Figure 3:
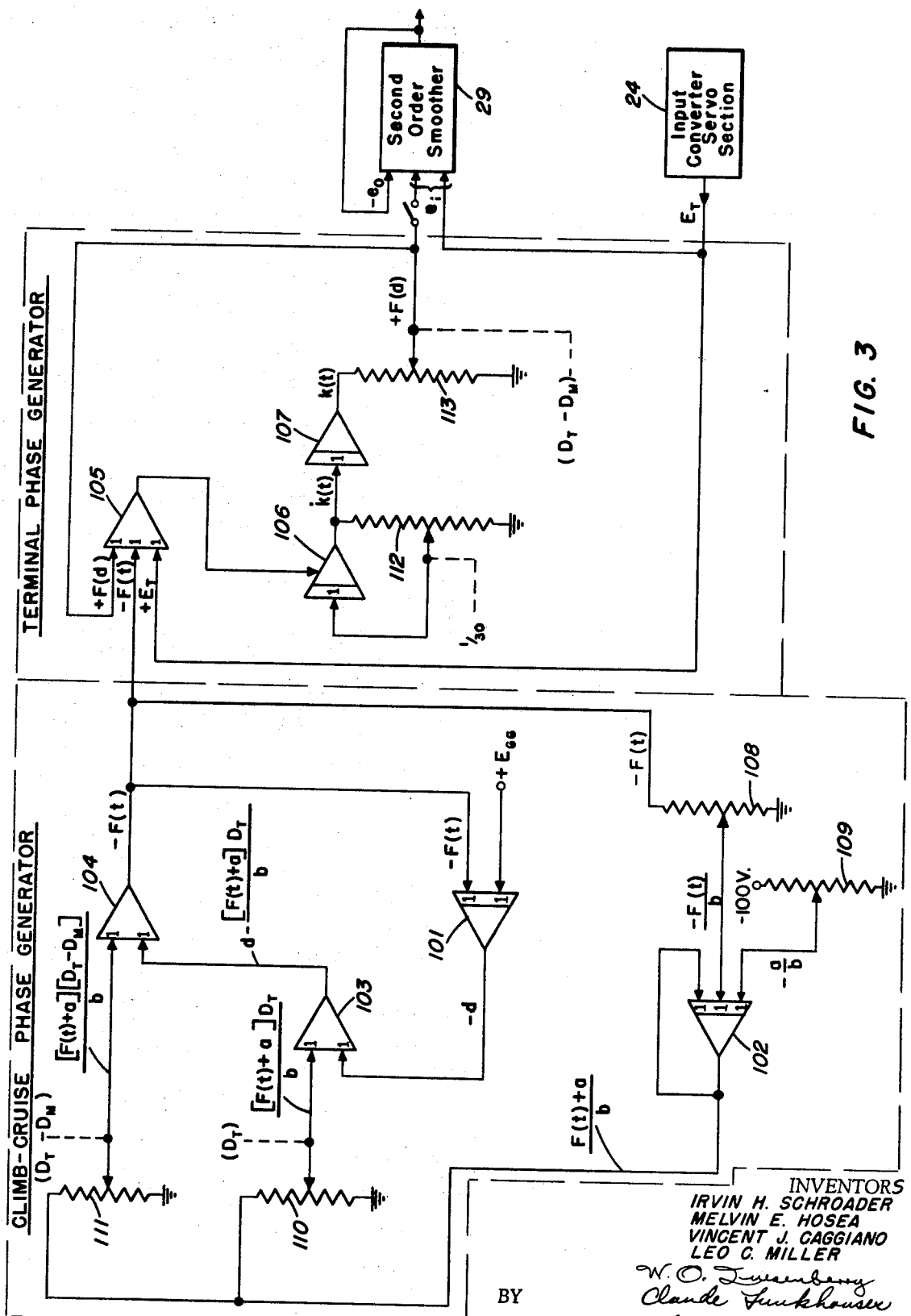
FIG. 3 illustrates one embodiment of a driving function generator for a long range missile program in accordance with the instant invention.

The circuitry for the novel $F(d)$ function generator 207, in FIG. 2 of the drawings, is depicted in detail in FIG. 3 of the drawings and is shown to comprise several sets of integrators which are in the "compute" or "initial-condition" states at various times during the type C program in order to satisfy the requirements of equations (6) through (12). In this regard, FIG. 6 of the drawings, which is a table of integrator status, serves to clarify the condition of each integrating amplifier in both the driving function generator and the second order smoother at all times during programmed flight.

The multiple flight course second order programming smoother set forth in copending applications Ser. Nos. 38,408 and 86,267 is merely utilized as a smoother in this instance and is designated broadly as a unit 29 in FIG. 3 of the drawings, the major portion of the programming being accomplished by manipulations in the novel function generator of the instant invention which varies the nature of $k(t)$ in equation (6).

Referring now specifically to FIG. 3 of the drawings, the driving function generator of the instant invention directs a function $F(d)$ to the input circuit of the second order smoother 29 and acts in conjunction with an $E_T$ signal derived from the input converter servo section 24 to produce a total input data function $e_i$ as set out in equations (6) and (7). The equation (11) form of $F(t)$ is rearranged below.

$$F(t)\,[b + D_M\,] = bd - a\,D_M$$
$$\text{or } F(t) = d - ([F(t) + a\,]\,D_M)/b \tag{13}$$

It will be noted in FIG. 3 that amplifier gains of unity have been arbitrarily assigned to all of the channels in the various amplifiers and integrators utilized in the driving function generator of the instant invention. However, it is to be understood that the gains in these channels may be varied by established computer programming procedures for scale factoring purposes.

It will be observed from FIG. 3 of the drawings that the overall driving function generator of the instant invention comprises basically a pair of function generators in series. This combination consists of a climb-cruise phase generator in series with a terminal phase generator. In actual operation, as will be subsequently shown, the terminal phase generator acts essentially as a pass through device during the climb-cruise phase and does not modify $F(t)$, the output of the climb-cruise phase generator, in any manner.

The climb-cruise phase generator system for developing values of the function $F(t)$ is described as follows:

It is assumed that the function $F(t)$, in the form set forth by equation (13) has already been generated and a feedback loop circuit is then provided for actually generating the quantity $F(t)$. The output signal from the climb-cruise phase generator is $-F(t)$ and this signal is directed to a $b$ potentiometer 108 which is shown grounded at one end. The slider arm of potentiometer 108 is adjusted to provide multiplication by the factor $1/b$ and this output is in turn directed to one input channel of a summing integrator 102 having three input channels.

In addition, a second potentiometer 109 is provided with a potential of −100 volts impressed upon one terminal, the other side of the potentiometer being grounded. The slider arm position of potentiometer 109 is adjusted to provide the value of the constant factor $-a/b$, this output being then directed to the second input channel of the integrating amplifier 102. The output from integrating amplifier 102 is directed back to a third input channel of amplifier 102 so that the output is caused to follow its input with inherent 180° phase shift and reversal in sign. The output of amplifier 102 is therefore $F(t) + a/b$. The integrating amplifier 102 is utilized in place of a normal summing amplifier in order to eliminate oscillation by increasing the damping rate of the system. Reference to equation (13) reveals that a product involving the quantity $D_M$ alone as a factor is required. However, the factor $D_M$ is not available in the Multiple Flight Course Second Order Programmer, disclosed in related copending application Ser. No. 38,408, as a separate entity for transmission to the computer. However, both the quantities $D_T$ and $D_T - D_M$ are available and these quantities may be utilized, as shown below, to obtain multiplication by the factor $D_M$ alone.

$$D_M = D_T - (D_T - D_M)$$

(14)

Therefore, the output from integrating amplifier 102 is directed simultaneously across two potentiometers 110 and 111, respectively, the slider arms of potentiometers 110 and 111 being controlled in accordance with the aforementioned quantities $D_T$ and $D_T - D_M$, respectively, to provide multiplication by these factors.

The constant $d$ in equation (13) is obtained by means of integrating amplifier 101 in FIG. 3. Integrator 101 is provided to insure that $F(t)$ is equal to $E_{GG}$, the initial condition elevation angle of the guidance transmitter, at guidance initiation. Therefore, summing integrator 101 receives two inputs, one of these being $-F(t)$ and the other being $E_{GG}$. The output of integrating amplifier 101 is $-d$ in equation (13). This latter output $-d$ is directed as one input to summing amplifier 103. A second input to this same amplifier 103 is received from the output of potentiometer 110 which has previously been shown to be $[F(t) + a]D_T/b$. The output from summing amplifier 103 is, therefore, the sum of its inputs or $$d - ([F(t) + a]D_T/b$$

which is directed as an input to one channel of summing amplifier 104. The second input channel of summing amplifier 104 receives the output from potentiometer 111, which has previously been shown to be $$([F(t) + a] [D_T - D_M])$$

and, therefore, the output from amplifier 104 is equal to the sum of its inputs or $-F(t)$ in accordance with equation (13).

Between launching of the missile and actual guidance initiation, summing amplifier 101 is in the "compute" state and, therefore, the feedback network composed of integrating amplifier 101 and the two following amplifiers 103 and 104 forces $F(t)$ to take on the value of $E_{GG}$, at the instant guidance begins, due to the feedback of the output from integrator 101 to its input by way of amplifiers 103 and 104. Therefore, the subsidiary loop comprising amplifiers 101, 103 and 104 forces $F(t)$ to equal $E_{GG}$ at guidance initiation. Following guidance initiation, integrating amplifier 101 is thrown into the "Hold" mode which essentially serves to disconnect its inputs and cause the integrating amplifier 101 to maintain its last output value, which is equal to the desired value of $d$ in equation (13). The status of integrator 101 at all times during the flight program is evident from FIG. 6 of the drawings.

The output voltage $-F(t)$ from amplifier 104 of the climb-cruise phase generator is fed to one input channel of the input summing amplifier 105 of the terminal phase generator shown in FIG. 3 of the drawings. Input amplifier 105 simultaneously receives a signal $E_T$, the elevation of the target, from the input converter servo section 24. The output from input amplifier 105 is directed into the initial-condition circuitry of integrator 106, the latter integrator serving only to effect phase inversion of the output signal from amplifier 105. The output from amplifier 106 is, in turn, directed as input to integrating amplifier 107 whose output is $k(t)$ which is fed across potentiometer 113. The slider arm position of potentiometer 113 is controlled in accordance with the $D_T - D_M$ signal. The output across potentiometer 113 is $F(d)$ which is fed back to an input channel of summing input amplifier 105 of the terminal phase generator. This latter feedback causes the output $F(d)$ to follow the input. Neither the $D_T - D_M$ multiplication nor the integration by integrator 107 actually effect the value of $F(d)$ due to the feedback loop, since we are dealing with an extremely slowly varying function during the climb-cruise phase. Therefore, $k(t)$ takes on the values set forth in equation (10) and the output $F(d)$ is equal to the input to amplifier 105 with a reversal in sign and, therefore, $F(d)$ equals $F(t) - E_T$ within the limits imposed by the velocity lag of the first order feedback circuit involved. Therefore, substituting this value of $F(d)$ in equation (7) we find that $e_l = F(t)$ except for the small time constant involved, which is of minimum significance here since we are dealing with a relatively slowly varying $D_T - D_M$ function. In this regard, therefore, during the climb-cruise phase the terminal phase generator does not modify the input it receives from the climb-cruise phase generator and essentially acts merely as a pass-through device.

Referring now to the terminal phase generator shown in FIG. 3, it has been determined empirically that a terminal phase of approximately 100 seconds is sufficiently long to allow a missile to dive or rise to a target on the deck without exceeding missile performance characteristics. The terminal phase, therefore, begins approximately 100 seconds before anticipated intercept of the target by the missile. This may be expressed mathematically as follows:

$$D_T - D_M = 100 \, (\dot{D}_T - \dot{D}_M)$$

(16)

At this time, a signal, for instance that from amplifier 105, trips relays, a switching circuit, a gate circuit, or any other means well-known in the art, in accordance with the table of integrator status set forth in FIG. 6 of the drawings, to initiate the terminal guidance phase.

At terminal phase initiation, integrator 106 is changed from the "initial condition" state to the "compute" mode of operation, which effectively serves to disconnect the $F(t)$ function from passing through the integrator 106 and, therefore, renders the output signal from the climb-cruise phase generator and amplifier 105 ineffective upon the program trajectory beyond this point.

The output from integrator 106 immediately after terminal phase initiation is $\dot{k}(t)$ which has the same value that it had immediately preceeding terminal phase initiation, thus fulfilling the previous requirement set forth in equation (9). Similarly, the output of integrator 107 is $k(t)$ and is the same value for just prior to as just after terminal phase initiation, thus satisfying the second transition requirement set forth in equation (8).

However, the output of integrator 106 is also directed across a potentiometer 112 whose slider arm position is set to a value of 1/30 or 0.33, this output being in turn directed to the input circuit of integrating amplifier 106. The result of this feedback around integrating amplifier 106, at reduced gain via potentiometer 112, is such that a time constant of 30 seconds is established and $\dot{k}(t)$ will decay to zero with the latter time constant. Thus, the output of amplifier 106 and hence the input to integrating amplifier 107, which is $\dot{k}(t)$, will be a slowly decreasing function, and the output from amplifier 107 will be $k(t)$ in accordance with the requirements of equation (12). The latter is verified mathematically as follows:

$$k(t) = k_T + \int_0^{T_{TP}} \dot{k}(t)dt \qquad (17)$$

which merely serves to state in mathematical form what is obvious from FIG. 3 of the drawings, namely that the output from integrator 107 is equal to its initial value plus the integrated sum of its input. In the latter instance, integrator 106 sets the limitations on the input to integrator 107 as follows:

$$\dot{k}(t) = \dot{k}_T e^{-t/30} \qquad (18)$$

Substituting the value of $\dot{k}(t)$ from equation (18) into equation (17) yields $$k(t) = k_T + \dot{k}_T \int_0^{T_{TP}} e^{-t/30}$$

$$= k_T + \dot{k}_T [\int_0^{T_{TP}} - 30\, e^{-t/30}] \qquad (19)$$

$$= k_T + 30\, \dot{k}_T (1 - e^{-T_{TP}/30}) \qquad (20)$$

which is in agreement with equation (12). Thus, the output from integrating amplifier 107 is $k(t)$ and is directed accordingly across the $D_T-D_M$ potentiometer 113 to produce a signal $F(d)$ in accordance with equation (7). As pointed out previously, the major distinction between $k(t)$ and $K$ in equation (5) for the type A program is that $k(t)$ is a slowly varying function of time rather than being a constant. The output from the terminal phase generator, $F(d)$, is directed as one input to the second order smoother 29. A switch is also provided in the line directing $F(d)$ to smoother 29 so that the input $F(d)$ may be disconnected at will and the smoother may be put through a standard type B program.

Although $\omega_n$ for the type C program is theoretically programmed in accordance with equation (3), it has been determined in actual practice that the introduction of the term $k(t)\,[D_T-D_M]$ during the terminal phase, as part of the input data $e_i$ to the second order smoother 29, causes $e_i$ to vary very rapidly and, therefore, in order to prevent $e_o$ from lagging $e_i$ by too great a margin, a higher value of the gain sensitivity factor $\omega_n$ is desired for the initial portion of the type C program flight trajectory than would ordinarily be obtained by programming $\omega_n$ in accordance with equation (3). Therefore, $\omega_n$ is held constant at a higher value, of the order of magnitude of 0.1, until the latter value is reached by normal programming in accordance with equation (3), the latter condition occurring approximately 30 to 40 seconds before target intercept. Thereafter, $\omega_n$ is programmed in accordance with equation (3) just as for the standard type B program. The latter variation in the manner in which $\omega_n$ is programmed is depicted graphically in FIG. 7 of the drawings.

The reason, as previously stated, for manipulating $\omega_n$ in the above manner is to strike a suitable compromise between keeping down noise and minimizing missile wing servo damage balanced against desirable close tracking of the target. To accomplish the latter, therefore, $\omega_n$ is initially held low at a value of 0.1 until the missile is within approximately 35 seconds of intercepting the target, at which point $\omega_n$ is allowed to rapidly approach unity as the missile nears the target, since the increased guidance sensitivity enabled thereby allows the missile to maneuver much more readily in following the target closely. In other words, the limits imposed by the velocity lag of the second order feedback circuit involved becomes considerably less critical as the value of $\omega_n$ is increased, a condition which is extremely valuable during the latter portion of the flight program when the missile is maneuvering in close quarters with its designated target.

The novel driving function generator of the instant invention, when used to provide an input to a second order smoother of the type set forth in copending applications Ser. Nos. 38,408 and 86,267, enhances the versatility of the latter programmer even further by enabling extended range capabilities for modern missiles presently in use. The economical and tactical advantages of such a system should be obvious.

Obviously, many modifications and variations of the present invention are possible in the light of the above teachings. It is therefore to be understood, that within the scope of the appended claims, the invention may be practiced otherwise than as specifically described.

What is claimed is:

1. In an apparatus for controlling the flight trajectory of a guided missile, second order programming computer and smoother means for manipulating input parameters in accordance with the relations $$e_o = \int_{t=0}^{t=P} \dot{e}_o dt,$$

$$\dot{e}_o = -2\omega_n(e_o - e_i) - \sigma \int_{t=0}^{t=P} \omega_n^2(e_o - e_i)dt$$

+ constant, and $$e_i = E_T + k(t)[D_T - D_M] = E_T + F(d)$$

where $e_o$ is the output data from said computer, $e_i$ is the input data to said computer, $\dot{e}_o$ is the first derivative of $e_o$, $\omega_n$ is the gain sensitivity factor of the computer, $E_T$ is the elevation of the target, $\sigma$ is a constant, $P$ is the present time, $G$ is the time of guidance initiation, $k(t)$ is a time varying programming factor and $F(d)$ is the output of an input driving function generator, a first input source of voltage for said second order programming computer means relating to $E_T$, driving function generator means F(d) electrically coupled to and directed as a second input to said second order programming computer means, said driving function generator means comprising a climb-cruise phase generator in series with a terminal phase generator, means within said climb-cruise phase generator to produce an output function $$F(t) = (b E_{GG} - a D_M)/b + D_M)$$

where $F(t)$ is the program variable defining the climb and cruise phases, $D_M$ is the slant range to the missile, $E_{GG}$ is the initial condition elevation angle of the guidance transmitter, and $a$ and $b$ are constants, the output of said climb-cruise phase generator being directed as a first input to said terminal phase generator, means electrically connected to the input of said terminal phase generator providing a second input to said terminal phase generator relating to $E_T$, feedback means electrically connected to the output of said terminal phase generator to feed back the output $F(d)$ of said driving function generator as a third input to said terminal phase generator, means within said terminal phase generator for acting upon said first, second and third inputs prior to terminal phase initiation to produce an output function $$k(t) = \int_G^P [F(d) + E_T - F(t)] dt,$$

means within said terminal phase generator to render ineffective said first, second and third inputs upon terminal phase initiation, means within said terminal phase generator to produce after terminal phase initiation a function $k(t) = k_T + 30 \dot{k}_T (1 - e T_{TP}/30)$ where $k_T$ is the value of $k(t)$ at terminal phase initiation, $\dot{k}_T$ is the first derivative of $k_T$, and $T_{TP}$ is the time from terminal phase initiation to the present, means to feed back the output voltage $e_o$ of said second order programming computer means to its input, and means delaying maximum gain sensitivity of said computer means until the missile is within a predetermined range of the target, whereby noisy input radar data is smoothed until maximum maneuver ability of the missile is required.

2. The apparatus of claim 1 including means to vary the gain sensitivity factor $\omega_n$ of the second order computer means in accordance with the relation $\omega_n = c/(T_{P1} +) of)$ where $T_{PI}$ is the time remaining until intercept of the target by the missile, and $c$ is a constant 3. The apparatus of claim 1 including means to disconnect the output F(dsaid driving function generator means from the input of said second order computer means to enable a medium range flight trajectory to be programmed.

4. The apparatus of claim 1 including means to delay terminal phase initiation until $$D_T - D_M = 100 (\dot{D}_T - \dot{D}_M)$$

where $D_T$ is the slant range to the target $D_M$ is the slant range to the missile, $\dot{D}_T$ is the first derivative of $D_T$ and $\dot{D}_M$ is the first derivative of $D_M$.

5. The apparatus of claim 1 including means to limit the minimum value of the computer means gain sensitivity factor $\omega_n$ to a value of 0.1.

6. The apparatus of a claim 2 including means to limit the minimum value of the computer means gain sensitivity factor to a value of $\omega_n = 0.1$.

7. The apparatus of claim 2 wherein the value of $c$ is in the range from 3.5 to 4.5.

8. The apparatus of claim 6 wherein the value of $c$ is in the range from 3.5 to 4.5.

9. The apparatus of claim 6 including means to delay terminal phase initiation until $D_T - D_M = 100 (\dot{D}_T - \dot{D}_M)$ where $D_T$ is the slant range to the target, $D_M$ is the slant range to the missile, $\dot{D}_T$ is the first derivative of $D_T$, and $\dot{D}_M$ is the first derivative of $D_M$ 10. In a missile programming system utilizing a second order computing device, driving function generator means electrically connected to the input of said second order computing device whose electrical output is directed as an input to said second order computing device, said driving function generator means comprising a climb-cruise phase generator in series with a terminal phase generator, means within said terminal phase generator to cause said terminal phase generator to act merely as a pass through device for the signal generated by said climb-cruise generator during the climb-cruise phase, means within said terminal phase generator to render ineffective upon terminal phase initiation the input from said climb-cruise phase generator to said terminal phase generator, and means for effecting a smooth transition from said climb-cruise phase to said terminal phase.

* * * * *